United States Patent
Usui et al.

(10) Patent No.: US 11,613,642 B2
(45) Date of Patent: Mar. 28, 2023

(54) ETHYLENE-VINYL ALCOHOL COPOLYMER COMPOSITION, PELLETS, AND MULTILAYER STRUCTURE

(71) Applicant: Mitsubishi Chemical Corporation, Tokyo (JP)

(72) Inventors: Shintaro Usui, Tokyo (JP); Daichi Nishimura, Tokyo (JP); Minako Ikeshita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/678,273

(22) Filed: Nov. 8, 2019

(65) Prior Publication Data

US 2020/0087504 A1 Mar. 19, 2020

Related U.S. Application Data

(63) Continuation of application No. PCT/JP2018/024303, filed on Jun. 27, 2018.

(30) Foreign Application Priority Data

Jun. 27, 2017 (JP) ............................. JP2017-124964

(51) Int. Cl.
| | |
|---|---|
| *C08L 29/06* | (2006.01) |
| *B29B 9/12* | (2006.01) |
| *B32B 27/18* | (2006.01) |
| *B32B 27/30* | (2006.01) |
| *B29B 9/16* | (2006.01) |
| *C08K 3/22* | (2006.01) |
| *C08L 29/04* | (2006.01) |
| *B32B 27/32* | (2006.01) |

(Continued)

(52) U.S. Cl.
CPC ............... *C08L 29/06* (2013.01); *B29B 9/12* (2013.01); *B29B 9/16* (2013.01); *B32B 7/12* (2013.01); *B32B 25/042* (2013.01); *B32B 25/08* (2013.01); *B32B 25/14* (2013.01); *B32B 27/08* (2013.01); *B32B 27/18* (2013.01); *B32B 27/20* (2013.01); *B32B 27/22* (2013.01); *B32B 27/288* (2013.01); *B32B 27/302* (2013.01); *B32B 27/304* (2013.01); *B32B 27/306* (2013.01); *B32B 27/308* (2013.01); *B32B 27/32* (2013.01); *B32B 27/322* (2013.01); *B32B 27/325* (2013.01); *B32B 27/34* (2013.01); *B32B 27/36* (2013.01); *B32B 27/365* (2013.01); *C08K 3/22* (2013.01); *C08L 29/04* (2013.01); *B29B 9/06* (2013.01); *B29B 9/065* (2013.01); *B29K 2023/086* (2013.01); *B29K 2105/0044* (2013.01); *B32B 2250/24* (2013.01); *B32B 2270/00* (2013.01); *B32B 2307/308* (2013.01); *B32B 2307/732* (2013.01); *B32B 2439/46* (2013.01); *B32B 2439/60* (2013.01); *B32B 2439/70* (2013.01); *B32B 2439/80* (2013.01); *C08K 2003/321* (2013.01); *C08K 2003/328* (2013.01); *C08L 2201/08* (2013.01); *C08L 2205/025* (2013.01); *F26B 17/00* (2013.01)

(58) Field of Classification Search
CPC ...... C08L 29/06; C08L 29/04; C08L 2201/08; C08L 2205/025; C08K 3/22; C08K 2003/328; C08K 2003/321; B29B 9/12; B29B 9/16; B29B 9/06; B29B 9/065; B32B 27/18; B32B 27/306; B32B 27/322; B32B 25/08; B32B 7/12; B32B 27/34; B32B 27/32; B32B 27/308; B32B 27/08; B32B 27/365; B32B 27/302; B32B 25/14; B32B 27/288; B32B 25/042; B32B 27/20; B32B 27/304; B32B 27/36; B32B 27/22; B32B 27/325; B32B 2439/60; B32B 2307/308; B32B 2307/732; B32B 2439/46; B32B 2439/70; B32B 2250/24; B32B 2270/00; B32B 2439/80; B29K 2023/086; B29K 2105/0044; F26B 17/00
See application file for complete search history.

(56) References Cited

U.S. PATENT DOCUMENTS

| | | | |
|---|---|---|---|
| 4,816,342 A * | 3/1989 | Farrell | .................... B32B 27/18 428/475.5 |
| 5,164,438 A | 11/1992 | Hiroshi et al. | |

(Continued)

FOREIGN PATENT DOCUMENTS

| | | |
|---|---|---|
| CN | 1280148 A | 1/2001 |
| CN | 1392889 A | 1/2003 |

(Continued)

OTHER PUBLICATIONS

European Search Report issued in European Patent Application No. 18824541.9 dated Jun. 5, 2020.

(Continued)

*Primary Examiner* — Patrick D Niland
(74) *Attorney, Agent, or Firm* — Greenblum & Bernstein, P.L.C.

(57) ABSTRACT

An ethylene-vinyl alcohol copolymer composition contains: (A) an ethylene-vinyl alcohol copolymer including two or more types of ethylene-vinyl alcohol copolymers having different ethylene structural unit contents; and (B) an iron compound; wherein the iron compound (B) is present in an amount of 0.01 to 5 ppm on a metal basis based on the weight of the ethylene-vinyl alcohol copolymer composition. The ethylene-vinyl alcohol copolymer composition is substantially free from coloration and excellent in heat stability.

5 Claims, No Drawings

(51) Int. Cl.
  *B32B 25/08*   (2006.01)
  *B32B 7/12*    (2006.01)
  *B32B 27/34*   (2006.01)
  *B32B 27/08*   (2006.01)
  *B32B 27/36*   (2006.01)
  *B32B 25/14*   (2006.01)
  *B32B 27/28*   (2006.01)
  *B32B 25/04*   (2006.01)
  *B32B 27/20*   (2006.01)
  *B32B 27/22*   (2006.01)
  *B29K 23/00*   (2006.01)
  *B29K 105/00*  (2006.01)
  *F26B 17/00*   (2006.01)
  *B29B 9/06*    (2006.01)
  *C08K 3/32*    (2006.01)

(56) References Cited

U.S. PATENT DOCUMENTS

| | | | |
|---|---|---|---|
| 6,232,382 | B1 | 5/2001 | Ninomiya et al. |
| 6,451,967 | B1 | 9/2002 | Ninomiya et al. |
| 6,759,107 | B1 | 7/2004 | Tai et al. |
| 2003/0022974 | A1 | 1/2003 | Shinji et al. |
| 2015/0159005 | A1 | 6/2015 | Nakazawa et al. |
| 2016/0244601 | A1 | 8/2016 | Kawai |
| 2017/0183426 | A1 | 6/2017 | Kawai et al. |
| 2018/0355163 | A1 | 12/2018 | Sato et al. |
| 2019/0002612 | A1 | 1/2019 | Nishimura et al. |
| 2019/0010305 | A1 | 1/2019 | Nishimura et al. |
| 2020/0048387 | A1* | 2/2020 | Takeshita ............... C08K 13/02 |
| 2020/0109251 | A1* | 4/2020 | Usui ..................... B29B 9/02 |

FOREIGN PATENT DOCUMENTS

| | | |
|---|---|---|
| CN | 104185652 A | 12/2014 |
| CN | 105579524 A | 5/2016 |
| EP | 1316582 A1 | 6/2003 |
| JP | 63-230757 | 9/1988 |
| JP | 7-330994 | 12/1995 |
| JP | 8-311276 | 11/1996 |
| JP | 9-77948 | 3/1997 |
| JP | 2001-098122 | 4/2001 |
| JP | 2001-131376 | 5/2001 |
| JP | 2008-230112 | 10/2008 |
| JP | 2016-029157 | 3/2016 |
| TW | 201345929 A | 11/2013 |
| TW | 201402682 A | 1/2014 |
| TW | 201615674 A | 5/2016 |
| WO | 2013/146533 | 10/2013 |
| WO | 2017/115847 | 7/2017 |
| WO | 2017/115848 | 7/2017 |
| WO | 2017/115849 | 7/2017 |

OTHER PUBLICATIONS

Official Communication issued in SINGAPORE Patent App. No. 11201804720P, dated Jun. 26, 2019 (English translation).
ISR issued in WIPO Patent Application No. PCT/JP2018/024303, dated Oct. 2, 2018 (English translation).
IPRP issued in WIPO Patent Application No. PCT/JP2018/024303, dated Jan. 9, 2020 (English translation).
ISR issued in WIPO Patent Application No. PCT/JP2016/089122, dated Feb. 7, 2017 (English translation).
IPRP issued in WIPO Patent Application No. PCT/JP2016/089122, dated Jul. 12, 2018 (English translation).
U.S. Appl. No. 16/064,307, filed Jun. 20, 2018.
Singaporean Office Action issued in SG Patent Application No. 11201910484W, dated Nov. 9, 2020.
Office Action issued in Japanese Patent Application No. 2018-534184, dated Jun. 29, 2021, English translation.
Office Action for CN App. No. 201880030143.3, dated Jul. 12, 2022 (w/ translation).
Office Action issued in CN Patent Application No. 20180030143.3, dated Aug. 31, 2021, English translation.
Office Action for SG App. No. 11201910484W, dated Jul. 28, 2022.
Office Action for TW App. No. 107122164, dated Jan. 13, 2022 (w/ translation).

* cited by examiner

ETHYLENE-VINYL ALCOHOL COPOLYMER COMPOSITION, PELLETS, AND MULTILAYER STRUCTURE

RELATED APPLICATION

This application is a continuation of International Application No. PCT/JP2018/024303, filed on Jun. 27, 2018, which claims priority to Japanese Patent Application No. 2017-124964, filed on Jun. 27, 2017, the entire contents of each of which being hereby incorporated by reference.

TECHNICAL FIELD

The present disclosure relates to an ethylene-vinyl alcohol copolymer composition containing an ethylene-vinyl alcohol copolymer (hereinafter referred to as "EVOH resin") as a main component, and further relates to pellets formed from the EVOH resin composition, and to a multilayer structure. More specifically, the present disclosure relates to an EVOH resin composition substantially free from coloration and excellent in heat stability, and further relates to pellets formed from the EVOH resin composition and to a multilayer structure including a layer formed from the EVOH resin composition.

BACKGROUND ART

EVOH resin, particularly a saponified ethylene-vinyl acetate copolymer, is excellent in various properties such as gas barrier property and mechanical strength and, therefore, is widely used for films, sheets, containers, fibers, and the like in various application fields.

The stretchability of the EVOH resin tends to be increased as the ethylene structural unit content (hereinafter referred to as "ethylene content") of the EVOH resin increases. On the other hand, the gas barrier property of the EVOH resin is deteriorated as the ethylene content of the EVOH resin increases (as the vinyl alcohol structural unit content (hereinafter referred to as "vinyl alcohol content") of the EVOH resin decreases). In order to satisfy requirements for both the gas barrier property and the stretchability, it is proposed to use an EVOH resin having a higher vinyl alcohol content (i.e., a lower ethylene content, and a higher saponification degree) and an EVOH resin having a lower vinyl alcohol content (i.e., a higher ethylene content, and a lower saponification degree) in combination.

For example, JP-SHO63(1988)-230757 (PTL 1) proposes a composition prepared by using EVOH resins having different ethylene contents and different saponification degrees. PTL 1 states that a difference in ethylene content between two types of EVOH resins is not less than 4 mol %, that a difference in saponification degree between the EVOH resins is not less than 3 mol %, that a difference insolubility parameter between the EVOH resins is not less than a predetermined value, and that, where a laminate including an intermediate layer of the EVOH resin composition and polystyrene layers is formed by a vacuum pressure forming process, the resulting product is excellent in transparency, appearance, and gas barrier property, and is free from cracking and uneven thickness.

JP-HEI8(1996)-311276 (PTL 2) discloses an EVOH resin composition which contains two types of EVOH resins having ethylene contents differing from each other by 3 to 20 mol %, and has a specific boron concentration. PTL 2 further discloses that a laminate including an intermediate layer of the EVOH resin composition and propylene layers provided on the intermediate layer with the intervention of adhesive resin layers is free from whitening, streaking, and other stretching unevenness when being heat-stretched (vertically four times and then horizontally six times).

With the use of the arts described above, various products are produced by a melt forming process such as extrusion process or injection process. When the EVOH resin compositions are each melt-formed, the resins are susceptible to thermal degradation. In the methods using the different types of EVOH resins, particularly, an EVOH resin having a lower melting point is liable to suffer from the thermal degradation and coloration, because the EVOH resins having different melting points are melt-formed at a single temperature.

A known exemplary art for suppression of the coloration of the EVOH resin composition containing the different types of EVOH resins is such that EVOH resins each satisfying a specific requirement for a molecular weight as measured after heat treatment at 220° C. for 50 hours in a nitrogen atmosphere are used as the different types of EVOH resins (e.g., PTL 3). For production of the EVOH resins each satisfying the specific requirement, production conditions should be properly controlled. Hence, there is a need for an easier coloration-suppressing method.

RELATED ART DOCUMENT

Patent Document

PTL 1: JP-A-SHO63(1988)-230757
PTL 2: JP-A-HEI8(1996)-311276
PTL 3: JP-A-2016-29157

SUMMARY

In view of the foregoing, it is an object of the present disclosure to provide a resin composition which contains two or more types of EVOH resins having different melting points, and is substantially free from coloration even after heat treatment and excellent in heat stability.

The inventors conducted intensive studies in view of the foregoing and, as a result, found that an EVOH resin composition containing two or more types of EVOH resins having different ethylene contents and a specific very small amount of an iron compound is substantially free from the coloration even after the heat treatment.

According to a first aspect of the present disclosure, there is provided an EVOH resin composition containing: (A) an EVOH resin including two or more types of EVOH resins having different ethylene contents; and (B) an iron compound; wherein the iron compound (B) is present in an amount of 0.01 to 5 ppm on a metal basis based on the weight of the EVOH resin composition. According to a second aspect of the present disclosure, pellets formed from the EVOH resin composition are provided. According to a third aspect of the present disclosure, a multilayer structure including a layer formed from the EVOH resin composition is provided.

The EVOH resin composition of the present disclosure contains the EVOH resin (A) including the two or more types of EVOH resins having different ethylene contents, and the iron compound (B). In the EVOH resin composition, the iron compound (B) is present in an amount of 0.01 to 5 ppm on a metal basis based on the weight of the EVOH resin composition. The EVOH resin composition is substantially free from the coloration even after the heat treatment, and excellent in heat stability.

Where a difference in ethylene content between an EVOH resin having the highest ethylene content and an EVOH resin having the lowest ethylene content out of the two or more types of EVOH resins having different ethylene contents in the EVOH resin (A) is not less than 2 mol %, the EVOH resin composition is more excellent in coloration-suppressing effect and heat stability.

Where the EVOH resin (A) including the two or more types of EVOH resins having different ethylene contents at least includes: (A1) an EVOH resin having an ethylene content of less than 35 mol %; and (A2) an EVOH resin having an ethylene content of not less than 35 mol %, the EVOH resin composition is furthermore excellent in coloration-suppressing effect and heat stability.

Where the weight ratio of the EVOH resin (A1) having an ethylene content of less than 35 mol % to the EVOH resin (A2) having an ethylene content of not less than 35 mol % is (A1)/(A2)=90/10 to 10/90, the EVOH resin composition is still more excellent in coloration-suppressing effect and heat stability.

The pellets formed from the EVOH resin composition of the present disclosure are substantially free from the coloration, and excellent in heat stability. Therefore, the pellets of the present disclosure can be advantageously used, for example, as a packaging material for foods, chemicals, and agricultural chemicals.

The multilayer structure including the layer formed from the EVOH resin composition of the present disclosure has a good quality and, therefore, is particularly useful as a packaging material, for example, for foods, chemicals, and agricultural chemicals.

DESCRIPTION OF EMBODIMENTS

Preferred embodiments of the present disclosure will hereinafter be described in detail. It should be understood that these preferred embodiments are merely illustrative and should not be construed as being limitative.

EVOH Resin Composition

The EVOH resin composition of the present disclosure contains: (A) an EVOH resin as a main component including two or more types of EVOH resins having different ethylene contents; and (B) an iron compound. In the EVOH resin composition of the present disclosure, the EVOH resin (A) is a base resin. That is, the proportion of the EVOH resin (A) in the EVOH resin composition is typically not less than 70 wt. %, preferably not less than 80 wt. %, more preferably not less than 90 wt. %, particularly preferably not less than 95 wt. %. The respective components will hereinafter be described in turn.

EVOH Resin (A)

The EVOH resin is a water-insoluble thermoplastic resin typically prepared by saponifying a copolymer of ethylene and a vinyl ester monomer, i.e., an ethylene-vinyl ester copolymer. The EVOH resin (A) to be used in the present disclosure includes the two or more types of EVOH resins having different ethylene contents. The ethylene contents of the EVOH resins are each determined in conformity with ISO14663.

In the EVOH resin (A), a difference in ethylene content between an EVOH resin having the highest ethylene content and an EVOH resin having the lowest ethylene content is preferably not less than 2 mol %, more preferably 2 to 25 mol %, still more preferably 4 to 20 mol %, particularly preferably 5 to 18 mol %. If the difference in ethylene content is excessively small, it will be difficult to properly balance the formability and the gas barrier property. If the difference in ethylene content is excessively great, the compatibility between the EVOH resins tends to be reduced.

The difference in ethylene content between the two or more types of EVOH resins of the EVOH resin (A) is determined by measuring melt peak temperatures. More specifically, the ethylene contents of the two or more types of EVOH resins of the EVOH resin (A) can be calculated based on the measurement of the melt peak temperatures of the EVOH resin composition of the present disclosure, because the ethylene contents of the EVOH resins generally correlate with the melting points of the EVOH resins. The melt peak temperatures are determined by increasing the temperature at 10° C./minute from −50° C. to 230° C., reducing the temperature at 10° C./minute from 230° C. to −50° C., and increasing the temperature again at 10° C./minute from −50° C. to 230° C. by means of a differential scanning calorimeter (DSC).

A difference between the melt peak temperatures determined in the aforementioned manner for the EVOH resin (A) to be used in the present disclosure is typically not less than 3° C., preferably 3° C. to 40° C., more preferably 10° C. to 35° C., particularly preferably 20° C. to 30° C. If the melt peak temperature difference is excessively small, it will be difficult to properly balance the formability and the gas barrier property. If the melt peak temperature difference is excessively great, the compatibility between the EVOH resins tends to be reduced.

The number of the EVOH resins having different ethylene contents in the EVOH resin (A) is typically 2 to 4, preferably 2 to 3, particularly preferably 2. If a greater number of EVOH resins are used, the EVOH resin composition tends to be poorer in productivity and economy.

The EVOH resin (A) to be used in the present disclosure preferably at least includes an EVOH resin (A1) having an ethylene content of less than 35 mol % (hereinafter referred to as "EVOH resin (A1)") and an EVOH resin (A2) having an ethylene content of not less than 35 mol % (hereinafter referred to as "EVOH resin (A2)") for the suppression of the coloration of the EVOH resin composition after the heat treatment.

The EVOH resin (A1) typically has an ethylene content of less than 35 mol %, preferably 20 to 34 mol %, more preferably 22 to 34 mol %, particularly preferably 25 to 33 mol %. If the ethylene content of the EVOH resin (A1) is excessively low, the decomposition temperature and the melting point of the EVOH resin (A1) will be excessively close to each other, making the melt forming of the resin composition difficult. If the ethylene content of the EVOH resin (A1) is excessively high, the EVOH resin (A1) tends to provide an insufficient gas barrier property-imparting effect.

On the other hand, the EVOH resin (A2) typically has an ethylene content of not less than 35 mol %, preferably 35 to 60 mol %, more preferably 37 to 56 mol %. If the ethylene content of the EVOH resin (A2) is excessively low, the EVOH resin (A2) tends to provide an insufficient stretchability-improving effect, thereby deteriorating the secondary formability. If the ethylene content of the EVOH resin (A2) is excessively high, on the other hand, it will be necessary to select an EVOH resin having a higher ethylene content as the EVOH resin (A1) to control the ethylene content difference within the predetermined range. As a result, a layer of the EVOH resin composition will have an insufficient gas barrier property.

The ethylene contents of the EVOH resin (A1) and the EVOH resin (A2) are measured in conformity with ISO14663.

The EVOH resin (A1) typically has a vinyl ester saponification degree of not less than 90 mol %, preferably 95 to 100 mol %, particularly preferably 98 to 100 mol %. If the saponification degree of the EVOH resin (A1) is excessively low, the EVOH resin (A1) tends to provide an insufficient gas barrier property-imparting effect.

On the other hand, the EVOH resin (A2) typically has a vinyl ester saponification degree of not less than 90 mol %, preferably 93 to 100 mol %, particularly preferably 98 to 100 mol %. If the saponification degree of the EVOH resin (A2) is excessively low, the EVOH resin (A2) tends to provide an insufficient gas barrier property-imparting effect.

The vinyl ester saponification degrees of the EVOH resin (A1) and the EVOH resin (A2) are measured in conformity with JIS K6726 (with the use of a solution obtained by homogenously dissolving the EVOH resin in a water/methanol solvent).

The EVOH resin (A1) typically has a melt flow rate (MFR) of 1 to 100 g/10 minutes, preferably 3 to 50 g/10 minutes, particularly preferably 3 to 10 g/10 minutes (as measured at 210° C. with a load of 2160 g). If the MFR of the EVOH resin (A1) is excessively high, the EVOH resin composition tends to have unstable film formability. If the MFR of the EVOH resin (A1) is excessively low, the EVOH resin composition tends to be poorer in extrudability.

The EVOH resin (A2) typically has a melt flow rate (MFR) of 1 to 100 g/10 minutes, preferably 3 to 50 g/10 minutes, particularly preferably 3 to 30 g/10 minutes (as measured at 210° C. with a load of 2160 g). If the MFR of the EVOH resin (A2) is excessively high, the EVOH resin composition tends to have unstable film formability. If the MFR of the EVOH resin (A2) is excessively low, the EVOH resin composition tends to be poorer in extrudability.

The EVOH resin (A1) and the EVOH resin (A2) to be used in combination preferably have substantially the same resin flowability in the melt forming and, therefore, a difference ($\Delta$MFR) in MFR (as measured at 210° C. with a load of 2160 g) between the EVOH resin (A1) and the EVOH resin (A2) is preferably not greater than 5 g/10 minutes, more preferably not greater than 1 g/10 minutes. In general, the MFR of the EVOH resin is controlled by adjusting the saponification degree or the like.

The total proportion of the EVOH resin (A1) and the EVOH resin (A2) in the EVOH resin (A) is typically not less than 50 wt. %, preferably not less than 70 wt. %, particularly preferably not less than 90 wt. %.

The blend weight ratio of the EVOH resin (A1) to the EVOH resin (A2) (EVOH resin (A1)/EVOH resin (A2)) is typically 90/10 to 10/90, preferably 90/10 to 50/50, more preferably 88/12 to 60/40, particularly preferably 85/15 to 70/30. If the ratio of the EVOH resin (A1) is excessively low, the layer of the EVOH resin composition tends to have an insufficient gas barrier property. If the ratio of the EVOH resin (A1) is excessively high, the stretchability-improving effect of the EVOH resin (A2) tends to be reduced.

The EVOH resins having different ethylene contents may be provided, for example, in the following manner.

As described above, the EVOH resins are each prepared by saponifying a copolymer of ethylene and a vinyl ester monomer, i.e., an ethylene-vinyl ester copolymer. Vinyl acetate is generally used as the vinyl ester monomer for economy.

A known polymerization method such as solution polymerization method, suspension polymerization method, or emulsion polymerization method may be utilized for polymerization of ethylene and the vinyl ester monomer. In general, a solution polymerization method using methanol as a solvent is utilized. The saponification of the resulting ethylene-vinyl ester copolymer may be achieved by a known method.

The EVOH resins thus prepared each mainly contain an ethylene structural unit and a vinyl alcohol structural unit, and further contains a small amount of a vinyl ester structural unit left unsaponified.

Vinyl acetate is typically used as the vinyl ester monomer because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl esters may be typically each used alone or, as required, a plurality of vinyl esters may be selected from these vinyl esters to be used in combination.

The ethylene contents of the EVOH resins can be each controlled by adjusting the pressure of ethylene to be supplied when ethylene and the vinyl ester monomer are copolymerized. Thus, the EVOH resins having different ethylene contents can be prepared.

The EVOH resins to be used in the present disclosure may each further contain a structural unit derived from any of the following comonomers in an amount (e.g., not greater than 20 mol % of the EVOH resin) that does not impair the effects of the present disclosure.

The comonomers include: olefins such as propylene, 1-butene, and isobutene, hydroxyl-containing $\alpha$-olefins such as 3-buten-1-ol, 3-butene-1,2-diol, 4-penten-1-ol, and 5-hexene-1,2-diol, and derivatives including esterification products and acylation products of these hydroxyl-containing $\alpha$-olefins; hydroxyalkyl vinylidenes such as 2-methylenepropane-1,3-diol and 3-methylenepentane-1,5-diol; hydroxyalkyl vinylidene diacetates such as 1,3-diacetoxy-2-methylenepropane, 1,3-dipropionyloxy-2-methylenepropane, and 1,3-dibutyryloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1- to C18-alkyl group; acrylamide compounds such as acrylamide, N-alkylacrylamides each including a C1- to C18-alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1- to C18-alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers each including a C1- to C18-alkyl group such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate; halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

An EVOH resin having a primary hydroxyl group in its side chain is preferred because of its gas barrier property and excellent secondary formability. Particularly, an EVOH resin prepared by copolymerization with the hydroxyl-containing α-olefin is preferred, and an EVOH resin having a 1,2-diol structure in its side chain is especially preferred. Particularly, where the EVOH resin having the primary hydroxyl group in its side chain is used, the content of a structural unit derived from the primary hydroxyl-containing monomer is typically 0.1 to 20 mol %, preferably 0.5 to 15 mol %, particularly preferably 1 to 10 mol %, of the EVOH resin.

Post-modified EVOH resins such as urethanized, acetalized, cyanoethylated or oxyalkylenated EVOH resins may be used as the EVOH resins in the present disclosure.

The EVOH resin (A) to be used in the present disclosure includes two or more types of EVOH resins selected from the EVOH resins prepared in the aforementioned manner and having different ethylene contents.

The EVOH resin (A) typically has an ethylene structural unit content of 20 to 60 mol %, preferably 25 to 50 mol %, particularly preferably 25 to 48 mol %, as measured in conformity with ISO14663. If the ethylene structural unit content of the EVOH resin (A) is excessively low, the EVOH resin composition tends to be poorer in stretchability and high-humidity gas barrier property in applications requiring the gas barrier property. If the ethylene structural unit content of the EVOH resin (A) is excessively high, on the other hand, the EVOH resin composition tends to be poorer in gas barrier property.

The EVOH resin (A) typically has a vinyl ester saponification degree of 90 to 100 mol %, preferably 95 to 100 mol %, particularly preferably 98 to 100 mol %, as measured in conformity with JIS K6726 (with the use of a solution obtained by homogeneously dissolving the EVOH resin in a water/methanol solvent). If the saponification degree of the EVOH resin (A) is excessively low, the EVOH resin composition tends to be poorer in gas barrier property, heat stability, moisture resistance, and the like.

The EVOH resin (A) typically has a melt flow rate (MFR) of 0.5 to 100 g/10 minutes, preferably 1 to 50 g/10 minutes, particularly preferably 2 to 35 g/10 minutes (as measured at 210° C. with a load of 2160 g). If the MFR of the EVOH resin (A) is excessively high, the EVOH resin composition tends to have unstable film formability. If the MFR of the EVOH resin (A) is excessively low, the EVOH resin composition tends to have an excessively high viscosity, making melt extrusion difficult.

Iron Compound (B)

The EVOH resin composition of the present disclosure contains the iron compound (B) in addition to the EVOH resin (A) including the two or more types of EVOH resins having different ethylene contents, and the iron compound (B) is present in a specific very small amount in the EVOH resin composition. With this arrangement, the EVOH resin composition of the present disclosure is substantially free from the coloration, and excellent in heat stability.

In general, the EVOH resin is liable to be colored due to thermal degradation. This is supposedly because hydroxyl groups are thermally removed from the EVOH resin to generate double bonds in main chains of the EVOH resin, and hydroxyl group removed sites serve as dehydration starting points to promote dehydration of the EVOH resin, whereby a conjugated polyene structure is formed in the EVOH resin.

Those skilled in the art generally refrain from using an EVOH resin composition containing an iron compound (B), because a product formed from the iron-containing EVOH resin composition is liable to be colored due to iron ions. In the present disclosure, however, it is unexpectedly found that, where the EVOH resin composition contains a very small amount of the iron compound (B), the EVOH resin composition is substantially free from the coloration after the heat treatment, and is excellent in heat stability.

The aforementioned effects can be provided supposedly because the iron compound provides stable trivalent iron ions and, even with a very small amount of the iron compound, the iron ions form ion bonds and chelates with the hydroxyl groups, carboxyl groups, and other functional groups to stabilize the EVOH resin and suppress the dehydration.

The iron compound (B) may be present, for example, as an iron oxide, an iron hydroxide, an iron chloride or an iron salt, in an ionized form, or in the form of a complex coordinated with the resin or other ligands in the EVOH resin composition. Examples of the iron oxide include ferric oxide, ferrosoferric oxide, and ferrous oxide. Examples of the iron chloride include ferrous chloride, and ferric chloride. Examples of the iron hydroxide include ferrous hydroxide, and ferric hydroxide. Examples of the iron salt include inorganic salts such as iron phosphate and iron sulfate, and organic salts such as iron carboxylates (e.g., iron acetate, iron butyrate, iron stearate, and the like). These may be used alone or in combination.

From the viewpoint of the dispersibility in the EVOH resin composition, the iron compound (B) is preferably water-soluble. From the viewpoint of the dispersibility and the productivity, the iron compound (B) typically has a molecular weight of 100 to 10,000, preferably 100 to 1,000, particularly preferably 100 to 500.

The amount of the iron compound (B) contained in the EVOH resin composition of the present disclosure is 0.01 to 5 ppm, preferably 0.05 to 3 ppm, particularly preferably 0.3 to 1.5 ppm, on a metal basis based on the weight of the EVOH resin composition. If the amount of the iron compound (B) is excessively small, the EVOH resin composition is liable to have an insufficient coloration-suppressing effect. If the amount of the iron compound (B) is excessively great, on the other hand, the EVOH resin composition is liable to be poorer in heat stability.

The amount of the iron compound (B) is determined by ashing 0.5 g of the EVOH resin composition in an infrared heating oven (in an oxygen stream at 650° C. for 1 hour), dissolving the resulting ash in an acid, diluting the resulting solution to a predetermined volume with purified water to prepare a sample solution, and analyzing the sample solution by an ICP-MS (7500ce available from Agilent Technologies, Inc. using a standard addition method).

Other Thermoplastic Resin

The EVOH resin composition of the present disclosure may contain a thermoplastic resin other than the EVOH resin (A) in an amount (e.g., typically not greater than 30 wt. %, preferably not greater than 20 wt. %, particularly preferably not greater than 10 wt. %, based on the weight of the EVOH resin composition) that does not impair the effects of the present disclosure.

A known thermoplastic resin may be used as the other thermoplastic resin. Specific examples of the thermoplastic resin include polyamide resins, polyolefin resins, polyester resins, polystyrene resins, polyvinyl chloride resins, polycarbonate resins, polyacrylic resins, ionomers, ethylene-acrylic acid copolymers, ethylene-acrylate copolymers, ethylene-methacrylic acid copolymers, ethylene-methacrylate copolymers, polyvinylidene chlorides, vinyl ester resins, polyester elastomers, polyurethane elastomers, chlorinated polyethylenes, and chlorinated polypropylenes, which may be used alone or in combination.

Other Additives

The EVOH resin composition of the present disclosure may contain additives that are generally blended with the EVOH resin, as long as the effects of the present disclosure are not impaired. Examples of the additives include: inorganic double salt (e.g., hydrotalcites); plasticizer (e.g., aliphatic polyhydric alcohol such as ethylene glycol, glycerin or hexanediol); oxygen absorber [e.g., inorganic oxygen absorber such as aluminum powder, potassium sulfite or photo-catalytic titanium oxide; organic compound oxygen absorber such as ascorbic acid, ascorbic acid ester, ascorbic acid metal salt, polyhydric phenol compound (e.g., hydroquinone, gallic acid, hydroxyl-containing phenol aldehyde resin or the like), coordination compound obtained by coordination-bonding nitrogen-containing compound and non-iron transition metal (e.g., bis-salicylaldehyde-imine cobalt, tetraethylenepentamine cobalt, cobalt-Schiff base complex, porphyrins, macrocyclic polyamine complex, polyethylene-imine-cobalt complex or the like), terpene compound, reaction product obtained by reaction between amino acid and hydroxyl-containing reductive substance, triphenylmethyl compound or the like; or polymer oxygen absorber such as coordination compound obtained by coordination-bonding nitrogen-containing resin and non-iron transition metal (e.g., combination of m-xylenediamine (MXD) nylon and cobalt), blend of tertiary hydrogen-containing resin and non-iron transition metal (e.g., combination of polypropylene and cobalt), blend of unsaturated carbon-carbon bond-containing resin and non-iron transition metal (e.g., combination of polybutadiene and cobalt), photo-oxidation degradative resin (e.g., polyketone), anthraquinone polymer (e.g., polyvinylanthraquinone), or mixture containing any of these blends and photo initiator (benzophenone or the like), peroxide scavenger (commercially available antioxidant or the like) or deodorant (active carbon or the like)]; and thermal stabilizer, photo stabilizer, UV absorber, colorant, antistatic agent, surfactant (not serving as lubricant), antibacterial agent, antiblocking agent, and filler (e.g., inorganic filler or the like). For the suppression of the coloration, the oxygen absorber is particularly preferred, and the terpene compound is especially preferred. These compounds may be used alone or in combination.

EVOH Resin Composition Production Method

The EVOH resin composition of the present disclosure may be produced through the step of mixing the EVOH resins having different ethylene contents to prepare the EVOH resin (A), and the step of incorporating the iron compound (B) to the EVOH resins or the EVOH resin (A).

Known examples of a mixing method to be used in the step of mixing the EVOH resins having different ethylene contents to prepare the EVOH resin (A) include dry blending (pellet blending) method, melt mixing (compounding) method, and solution mixing method.

An example of the dry blending (pellet blending) method is a method (I) including the step of mixing pellets of the EVOH resins having different ethylene contents by means of a tumbler or the like.

An example of the melt mixing (compounding) method is a method (II) including the steps of melt-kneading the EVOH resins having different ethylene contents by means of a twin screw extruder or the like, and pelletizing the resulting mixture.

Examples of the solution mixing method include a method (III) including the steps of dissolving and mixing the EVOH resins having different ethylene contents in a solvent, forming the resulting solution into pellets by a known method such as strand method, hot cutting method or in-water cutting method, and drying the resulting pellets, and a method (IV) including the steps of dissolving and mixing ethylene-vinyl ester copolymers having different ethylene contents, subjecting the resulting solution to saponification, forming the resulting solution of the EVOH resin (A) into pellets by a known method such as strand method, hot cutting method or in-water cutting method, and drying the resulting pellets.

In the step of incorporating the iron compound (B) to the EVOH resins or the EVOH resin (A), exemplary known methods for incorporating the iron compound (B) to the EVOH resins or the EVOH resin (A) include dry blending method, melt mixing method, solution mixing method, and impregnation method, which may be used alone or in combination.

An example of the dry blending method is a method (i) including the step of dry-blending the EVOH resins or the EVOH resin (A) with the iron compound (B) by means of a tumbler or the like.

Examples of the melt mixing method include a method (ii) including the steps of dry-blending the EVOH resins or the EVOH resin (A) with the iron compound (B), melt-kneading the resulting blend, and forming the resulting melt into pellets or a product, and a method (iii) including the steps of adding the iron compound (B) to the EVOH resins or the EVOH resin (A) in a melted state, melt-kneading the resulting mixture, and forming the resulting melt into pellets or a product.

Examples of the solution mixing method include a method (iv) including the steps of preparing a solution by using commercially available EVOH resin pellets, adding the iron compound (B) to the solution, solidifying and forming the resulting solution into pellets, separating the pellets from the solution, and drying the pellets, and a method (v) including the steps of adding the iron compound (B) to a homogeneous solution (water/alcohol solution or the like) of the EVOH resin in the preparation of the EVOH resin, solidifying and forming the resulting solution into pellets, separating the pellets from the solution, and drying the pellets.

An example of the impregnation method is a method (vi) including the steps of bringing pellets of the EVOH resins or the EVOH resin (A) into contact with an aqueous solution containing the iron compound (B) to incorporate the iron compound (B) to the pellets of the EVOH resins or the EVOH resin (A), and then drying the resulting pellets.

In the present disclosure, the EVOH resin composition can be produced by using any of the aforementioned different methods in combination. Particularly, the method (I) is preferably used in the step of mixing the EVOH resins having different ethylene contents to prepare the EVOH resin (A), and the method (ii) is preferably used in the step of incorporating the iron compound (B) to the EVOH resins or the EVOH resin (A), because the resin composition produced by these methods is significantly improved in productivity and the effects of the present disclosure.

Pellets of the EVOH resin composition of the present disclosure to be produced by any of the aforementioned methods, and the pellets of the EVOH resins or the EVOH resin (A) to be used in any of the aforementioned methods may each have any desired shape. The pellets may each have, for example, spherical shape, oval shape, cylindrical shape, cubic shape, square prism shape, or the like, and typically the oval shape or the cylindrical shape. The oval pellets typically each have a minor diameter of 1 to 10 mm and a major diameter of 1.5 to 30 mm, preferably a minor diameter of 2 to 6 mm and a major diameter of 3 to 20 mm, more preferably a minor diameter of 2.5 to 5.5 mm and a major diameter of 3.5 to 10 mm, and the cylindrical pellets typically each have a bottom diameter of 1 to 6 mm and a length of 1 to 6 mm, preferably a bottom diameter of 2 to 5 mm and a length of 2 to 5 mm, for easy handling thereof in the subsequent use as a forming material.

As described above, a water-soluble iron compound is used as the iron compound (B) in the aforementioned methods. Examples of the iron compound include: iron oxides such as ferric oxide, ferrosoferric oxide, and ferrous oxide; iron chlorides such as ferrous chloride and ferric chloride; iron hydroxides such as ferrous hydroxide and ferric hydroxide; inorganic iron salts such as iron phosphate and iron sulfate; and organic iron salts such as iron carboxylates (e.g., iron acetate, iron butyrate, iron stearate, and the like). As described above, the iron compound (B) may be present in the form of a salt, in an ionized form, or in the form of a complex coordinated with the resin or other ligands in the EVOH resin.

Usable as the aqueous solution of the iron compound (B) in the method (vi) are an aqueous solution of any of the aforementioned iron compounds (B), and an aqueous solution which contains iron ions released from a steel material immersed in water containing chemical agents. In this case, the amount (on a metal basis) of the iron compound (B) to be contained in the EVOH resin composition may be controlled by adjusting the concentration of the iron compound (B) in the aqueous solution in which the pellets are immersed, the immersion temperature, the immersion period, and/or the like. The immersion period is typically 0.5 to 48 hours, preferably 1 to 36 hours, and the immersion temperature is typically 10° C. to 40° C., preferably 20° C. to 35° C. After the immersion, the pellets are separated from the aqueous solution by a known method, and dried by a known drying method. Various drying methods are usable for the drying, and examples of the drying methods include a stationary drying method and a fluidized drying method, which may be used alone or in combination.

The EVOH resin composition pellets typically have a water content of 0.01 to 0.5 wt. %, preferably 0.05 to 0.35 wt. %, particularly preferably 0.1 to 0.3 wt. %.

In the present disclosure, the water content of the EVOH resin composition pellets is measured and calculated in the following manner.

The weight (W1) of the EVOH resin composition pellets is measured by an electronic balance before the drying, and the EVOH resin composition pellets are dried at 150° C. for 5 hours in a hot air dryer and cooled for 30 minutes in a desiccator. Then, the weight (W2) of the resulting pellets is measured. The water content of the EVOH resin composition pellets is calculated from the following expression:

$$\text{Water content(wt. \%)} = [(W1-W2)/W1]100$$

The EVOH resin composition of the present disclosure is evaluated for heat stability based on a weight reduction percentage. The EVOH resin composition of the present disclosure typically has a weight reduction percentage of 0.7 to 1.1%, preferably 0.8 to 1.0%, particularly preferably 0.9%. If the weight reduction percentage is excessively low (weight reduction is excessively small), the EVOH resin composition is less susceptible to decomposition, and the viscosity of the EVOH resin composition tends to increase with time during the melt forming, resulting in poorer long-run formability. If the weight reduction percentage is excessively high (weight reduction is excessively great), the EVOH resin composition is excessively liable to be decomposed and foamed due to gas generated by the decomposition. This tends to adversely influence the appearance of the formed product.

The weight reduction percentage is determined by pulverizing the EVOH resin composition to a size of 1- to 5-mm square, heating 5 mg of the pulverized EVOH resin composition at a temperature of 230° C. at a gas flow rate of 20 mL/minute for 1 hour in a nitrogen atmosphere by means of a thermogravimeter (PYRIS 1 TGA available from Perkin Elmer, Inc.) and calculating the weight reduction percentage from the following expression based on the weights of the EVOH resin composition measured before and after the heating:

$$\text{Weight reduction percentage(\%)} = [(W_a - W_b)/W_a] \times 100$$

wherein $W_a$ is the weight of the EVOH resin composition before the heating, and $W_b$ is the weight of the EVOH resin composition after the heating.

The EVOH resin composition pellets thus produced may be used as they are for the melt forming. In order to ensure stable feeding of the EVOH resin composition pellets in the melt forming, a known lubricant may be applied to surfaces of the pellets. Examples of the lubricant include: higher fatty acids having a carbon number of not less than 12 (e.g., lauric acid, myristic acid, palmitic acid, stearic acid, behenic acid, and oleic acid); esters of the higher fatty acids (e.g., methyl esters, isopropyl esters, butyl esters, and octyl esters of the higher fatty acids); amides of the higher fatty acids (e.g., saturated higher fatty acid amides such as lauramide, myristamide, palmitamide, stearamide, and behenamide, unsaturated higher fatty acid amides such as oleamide and erucamide, and bis-higher fatty acid amides such as ethylene bis-stearamide, ethylene bis-oleamide, ethylene bis-erucamide, and ethylene bis-lauramide); low-molecular-weight polyolefins (e.g., low-molecular-weight polyethylenes and low-molecular-weight polypropylenes each having a molecular weight of about 500 to about 10,000, and acid modification products of these low-molecular-weight polyolefins); and higher alcohols having a carbon number of not less than 6, ester oligomers, and fluorinated ethylene resins. These compounds may be used alone or in combination. The amount of the lubricant present on the pellets is typically not greater than 5 wt. %, preferably not greater than 1 wt. %, based on the weight of the EVOH resin composition.

The EVOH resin composition may be prepared in any of various forms, e.g., in a pellet form, in a powdery form, or in a liquid form, for use as a forming material for various formed products. Particularly, the EVOH resin composition of the present disclosure is preferably provided as a melt-formable material, because the effects of the present disclosure can be efficiently provided. The EVOH resin composition of the present disclosure may be a resin composition prepared by mixing the EVOH resin composition with a resin other than the EVOH resin (A).

Exemplary products to be formed from the EVOH resin composition for practical applications include a single-layer film formed by using the EVOH resin composition of the present disclosure, and a multilayer structure including the layer formed by using the EVOH resin composition of the present disclosure.

Multilayer Structure

The multilayer structure of the present disclosure includes a layer formed from the EVOH resin composition of the present disclosure. The layer formed from the EVOH resin composition of the present disclosure (hereinafter referred to as "EVOH resin composition layer") may be laminated with some other base material (hereinafter referred to as "base resin") containing a thermoplastic resin other than the EVOH resin composition of the present disclosure as a main component. Thus, the EVOH resin composition layer can be strengthened, protected from moisture and other influence, or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block or random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, aromatic and aliphatic polyketones, which may be used alone or in combination.

Of these, the polyamide resins, the polyolefin resins, the polyester resins, and polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred.

Where EVOH resin composition layers a (a1, a2, . . . ) formed from the EVOH resin composition of the present disclosure and base resin layers b (b1, b2, . . . ) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed of a mixture obtained by re-melting cutoff pieces and defective products occurring during the production of the multilayer structure and containing the EVOH resin composition of the present disclosure and the base resin, possible combinations of the layers for the layered configuration include b/R/a, b/R/a/b, b/R/a/R/b, b/a/R/a/b, b/R/a/R/a/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin is properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may be each used alone, or two or more of these adhesive resins may be used as a mixture.

Where the adhesive resin layers are provided between the EVOH resin composition layer and the base resin layers in the multilayer structure, the adhesive resin layers are present on opposite sides of the EVOH resin composition layer and, therefore, a highly hydrophobic adhesive resin is preferably used for the adhesive resin layers.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., in amounts of not greater than 30 wt. %, preferably not greater than 10 wt. %). These may be used alone or in combination.

A known laminating method may be employed for laminating together the EVOH resin composition layer and the base resin layer (optionally with the adhesive resin layer provided between the layers). Examples of the laminating method include: a method in which a film or a sheet of the EVOH resin composition of the present disclosure is laminated with the base resin by melt extrusion; a method in which the base resin layer is laminated with the EVOH resin composition of the present disclosure by melt extrusion; a method in which the EVOH resin composition and the base resin are coextruded; a method in which the EVOH resin composition layer and the base resin layer are dry-laminated together with the use of a known adhesive agent such as of organic titanium compound, isocyanate compound, polyester compound or polyurethane compound; and a method in which a solution of the EVOH resin composition is applied on the base resin layer, and a solvent is removed from the applied solution. Of these methods, the coextrusion method is preferred from the viewpoint of costs and environmental concerns.

The multilayer structure described above may be further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is preferably close to the melting point of the multilayer structure, and is typically selected from a range of about 40° C. to about 170° C., preferably about 60° C. to about 160° C. If the stretching temperature is excessively low, poorer stretchability will result. If the stretching temperature is excessively high, it will be difficult to ensure stable stretching.

The resulting multilayer structure may be further subjected to a heat-setting process to ensure dimensional stability after the stretching. The heat-setting process may be performed in a known manner. For example, the stretched film is typically heat-treated at 80° C. to 180° C., preferably 100° C. to 165° C., for about 2 to about 600 seconds, while being kept tense. Where the stretched multilayer film produced by using the EVOH resin composition of the present disclosure is used as a shrinkable film, the stretched film may be cold-set so as to be imparted with a heat-shrinkable property by applying cold air over the stretched film without performing the above heat-setting process.

In some case, a cup-shaped or tray-shaped multilayer container may be produced from the multilayer structure of the present disclosure. For the production of the multilayer container, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the EVOH resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 μm, preferably 30 to 3,000 μm, particularly preferably 50 to 2,000 μm. The thickness of the EVOH resin composition layer is typically 1 to 500 μm, preferably 3 to 300 μm, particularly preferably 5 to 200 μm. The thickness of the base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the EVOH resin composition layer and the base resin layer of the multilayer structure (EVOH resin composition layer/base resin layer) (if these layers each include a plurality of layers, the thickness ratio between the thickest one of the EVOH resin composition layers and the thickest one of the base resin layers) is typically 1/99 to 50/50, preferably 5/95 to 45/55, particularly preferably 10/90 to 40/60. The thickness ratio between the EVOH resin composition layer and the adhesive resin layer of the multilayer structure (EVOH resin composition layer/adhesive resin layer) (if these layers each include a plurality of layers, the thickness ratio between the thickest one of the EVOH resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, and pharmaceutical products. In particular, the EVOH resin composition layer formed from the EVOH resin composition of the present disclosure is substantially free from the coloration, and excellent in heat stability and, therefore, is particularly useful as a packaging material for packaging foods, chemicals, agricultural chemicals, and the like.

EXAMPLES

The embodiments of the present disclosure will hereinafter be described more specifically by way of examples thereof. However, it should be understood that the present disclosure be not limited to the examples within the scope of the present disclosure.

In the following examples, "parts" means "parts by weight" unless otherwise specified.

Prior to implementation of Examples, pellets of the following EVOH resins were prepared, and the amounts of an iron compound (B) contained in the respective EVOH resins were measured.

EVOH resin (A1): Ethylene-vinyl alcohol copolymer having an average ethylene structural unit content of 29 mol %, a saponification degree of 99.6 mol %, and an MFR of 3.9 g/10 minutes (as measured at 210° C. with a load of 2160 g)

EVOH resin (A2): Ethylene-vinyl alcohol copolymer having an average ethylene structural unit content of 44 mol %, a saponification degree of 99.6 mol %, and an MFR of 3.3 g/10 minutes (as measured at 210° C. with a load of 2160 g)

Measurement of Amounts of Iron Compound (B)

The amounts of the iron compound (B) in the EVOH resin (A1) and the EVOH resin (A2) were each determined by pulverizing the pellets of each of the EVOH resin (A1) and the EVOH resin (A2), ashing 0.5 g of the pulverized sample in an infrared heating oven (in an oxygen stream at 650° C. for 1 hour), dissolving the resulting ash in an acid, diluting the resulting solution to a predetermined volume with purified water to prepare a sample solution, and analyzing the sample solution by an ICP-MS (ICP mass spectrometer 7500ce available from Agilent Technologies, Inc.) through a standard addition method. As a result, the amounts of the iron compound (B) in the EVOH resin (A1) and the EVOH resin (A2) were each 0 ppm on a metal basis.

Example 1

An EVOH resin (A) was prepared by dry-blending 80 parts of the pellets of the EVOH resin (A1) and 20 parts of the pellets of the EVOH resin (A2).

Then, 100 parts of the EVOH resin (A) and 0.000034 parts (0.1 ppm on a metal basis based on the weight of EVOH resin composition) of iron (III) phosphate n-hydrate (available from Wako Pure Chemical Industries, Ltd., and having a drying loss of 20.9 wt. % when being dried at 230° C.) were preheated at 230° C. for 5 minutes and then melt-kneaded for 5 minutes by means of a plastograph (available from Brabender Corporation), whereby an EVOH resin composition was prepared. The EVOH resin composition thus prepared was pulverized (with a crusher rotation speed of 650 rpm) by a crusher (SKR16-240 available from Sometani Sangyo Co., Ltd.) The pulverized product of the EVOH resin composition was in a granular form having a size of 1- to 5-mm square.

Example 2

An EVOH resin composition and a pulverized product of the EVOH resin composition of Example 2 were prepared in substantially the same manner as in Example 1, except that the amount of the iron (III) phosphate n-hydrate was 0.00034 parts (1 ppm on a metal basis based on the weight of the EVOH resin composition).

Comparative Example 1

An EVOH resin composition and a pulverized product of the EVOH resin composition of Comparative Example 1 were prepared in substantially the same manner as in Example 1, except that the amount of the iron (III) phosphate n-hydrate was 0.0034 parts (10 ppm on a metal basis based on the weight of the EVOH resin composition).

Comparative Example 2

An EVOH resin composition and a pulverized product of the EVOH resin composition of Comparative Example 2 were prepared in substantially the same manner as in Example 1, except that the iron (III) phosphate n-hydrate was not blended.

The EVOH resin compositions of Examples 1 and 2, and Comparative Examples 1 and 2 were each evaluated for coloration and heat stability by the following methods. The results are shown below in Table 1.

Evaluation for Coloration

The pulverized products of the EVOH resin compositions prepared in the aforementioned manner were each heated at 150° C. for 5 hours in an air atmosphere in an oven. The heated pulverized product was evaluated for coloration by means of a visual analyzer IRIS VA400 (available from Alfa M.O.S. K.K.) based on the percentage of a colored area having Color No. 3819 (R232, G232, B184). Color No. 3819 means a yellowish color, and a higher percentage of the colored area having Color No. 3819 means that the heated sample was colored yellow.

Evaluation for Heat Stability

The weight reduction percentage was determined by heating 5 mg of each of the pulverized products of the EVOH resin compositions at a temperature of 230° C. at a gas flow rate of 20 mL/minute for 1 hour in a nitrogen atmosphere by means of a thermogravimeter (PYRIS 1 TGA available from Perkin Elmer, Inc.) and calculating the weight reduction percentage from the following expression based on the weights of the EVOH resin composition measured before and after the heating:

Weight reduction percentage(%)=$[(W_a-W_b)/W_a]\times100$ wherein $W_a$ is the weight of the EVOH resin composition before the heating, and $W_b$ is the weight of the EVOH resin composition after the heating.

The weight reduction percentage was rounded to the first decimal place. The EVOH resin composition was evaluated for heat stability based on the following evaluation criteria:
A: 0.9% (Particularly superior heat stability)
B: 0.8% or 1.0% (Superior heat stability)
C: 0.7% or 1.1% (Excellent heat stability)
D: 0.6% (Poor heat stability)
E: Less than 0.5% or not less than 1.2% (Very poor heat stability)

TABLE 1

|  | Example 1 | Example 2 | Comparative Example 1 | Comparative Example 2 |
|---|---|---|---|---|
| Ethylene content [mol %] of EVOH resin (A1) | 29 | 29 | 29 | 29 |
| Ethylene content [mol %] of EVOH resin (A2) | 44 | 44 | 44 | 44 |
| Difference in ethylene content | 15 | 15 | 15 | 15 |
| Blend weight ratio (A1)/(A2) | 80/20 | 80/20 | 80/20 | 80/20 |
| Amount [ppm] of iron compound (B) on metal basis | 0.1 | 1 | 10 | 0 |
| Percentage [%] of colored area having Color No. 3819 | 4.0 | 3.9 | 2.0 | 5.0 |
| Heat stability evaluation | | | | |
| Weight reduction percentage (%) | 1.0 | 0.9 | 1.4 | 1.6 |
| Rating | B | A | E | E |

In Examples 1 and 2 in which the iron compound (B) was contained in a specific very small amount, the coloration after the heating was more suppressed, and the heat stability was more excellent than in Comparative Examples 1 and 2. As apparent from the above results, an EVOH resin composition substantially free from the coloration and excellent in heat stability can be provided by blending a specific very small amount of the iron compound (B). Particularly, Example 2 is excellent in both coloration-suppressing effect and heat stability.

While specific forms of the embodiments of the present disclosure have been shown in the aforementioned examples, the examples are merely illustrative but not limitative. It is contemplated that various modifications apparent to those skilled in the art could be made within the scope of the disclosure.

The EVOH resin composition of the present disclosure is substantially free from coloration and excellent in heat stability. Therefore, the EVOH resin composition of the present disclosure is particularly useful as a material for packaging general foods, condiments such as mayonnaise and dressing, fermented foods such as miso, fat and oil such as salad oil, beverages, cosmetics, and pharmaceutical products.

The invention claimed is:

1. An ethylene-vinyl alcohol copolymer composition comprising:
   (A) an ethylene-vinyl alcohol copolymer comprising:
      (A1) an ethylene-vinyl alcohol copolymer having an ethylene structural unit content of less than 35 mol %; and
      (A2) an ethylene-vinyl alcohol copolymer having an ethylene structural unit content of not less than 35 mol %; and
   (B) an iron compound;
   wherein the ethylene-vinyl alcohol copolymer (A) has an ethylene structural unit content of 20 to 60 mol %, and
   wherein the iron compound (B) is present in an amount of 0.01 to 1 ppm on a metal basis based on a weight of the ethylene-vinyl alcohol copolymer composition.

2. The ethylene-vinyl alcohol copolymer composition according to claim 1, wherein a difference in ethylene structural unit content between an ethylene-vinyl alcohol copolymer having a highest ethylene structural unit content and an ethylene-vinyl alcohol copolymer having a lowest ethylene structural unit content out of the two or more ethylene-vinyl alcohol copolymers in the ethylene-vinyl alcohol copolymer (A) is not less than 2 mol %.

3. The ethylene-vinyl alcohol copolymer composition according to claim 1, wherein a weight ratio of the ethylene-vinyl alcohol copolymer (A1) to the ethylene-vinyl alcohol copolymer (A2) is (A1)/(A2)=90/10 to 10/90.

4. Pellets comprising the ethylene-vinyl alcohol copolymer composition according to claim 1.

5. A multilayer structure comprising a layer which comprises the ethylene-vinyl alcohol copolymer composition according to claim 1.

* * * * *